United States Patent
Mäder

(10) Patent No.: US 9,714,143 B2
(45) Date of Patent: Jul. 25, 2017

(54) REGULATION OF DRIVES OF CONVEYING SECTIONS OF A CONVEYING SYSTEM

(71) Applicant: FERAG AG, Hinwill (CH)

(72) Inventor: Carl Conrad Mäder, Hittnau (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 14/782,983

(22) PCT Filed: Mar. 27, 2014

(86) PCT No.: PCT/CH2014/000040
§ 371 (c)(1),
(2) Date: Oct. 7, 2015

(87) PCT Pub. No.: WO2014/166004
PCT Pub. Date: Oct. 16, 2014

(65) Prior Publication Data
US 2016/0068351 A1    Mar. 10, 2016

(30) Foreign Application Priority Data

Apr. 11, 2013    (CH) ........................................ 0756/13

(51) Int. Cl.
*B65G 43/10* (2006.01)
*B65G 43/08* (2006.01)

(52) U.S. Cl.
CPC ............. *B65G 43/08* (2013.01); *B65G 43/10* (2013.01)

(58) Field of Classification Search
CPC .................................................... B65G 43/10
USPC ......... 198/459.1, 459.8, 460.1, 461.1, 462.3, 198/575, 577, 792
See application file for complete search history.

(56) References Cited

U.S. PATENT DOCUMENTS

| | | | | |
|---|---|---|---|---|
| 3,075,630 A | * | 1/1963 | Fisk | B65G 43/08 198/460.1 |
| 3,817,368 A | * | 6/1974 | Wentz | B65G 47/52 198/357 |
| 4,514,963 A | * | 5/1985 | Bruno | B65B 9/06 198/460.1 |
| 4,653,630 A | | 3/1987 | Bravin | |
| 5,097,939 A | * | 3/1992 | Shanklin | B65G 47/31 198/419.2 |

(Continued)

FOREIGN PATENT DOCUMENTS

| | | |
|---|---|---|
| DE | 3241397 | 5/1983 |
| DE | 19644092 | 5/1998 |

(Continued)

OTHER PUBLICATIONS

Switzerland Search Report dated May 3, 2013, Application No. CH 00756/13.

*Primary Examiner* — Douglas Hess
(74) *Attorney, Agent, or Firm* — Rankin, Hill & Clark LLP

(57) ABSTRACT

A conveying system includes several conveying sections that are driven in each case by an individual drive. A regulation unit for regulating a regulated drive of one of the two conveying sections includes a measuring device and a regulating device. The measuring device measures loading of the conveying system in a coupling region between the conveying section and another conveying section. The regulating device regulates the regulated drive in accordance with the measured loading.

18 Claims, 3 Drawing Sheets

(56) References Cited

U.S. PATENT DOCUMENTS

| | | | | |
|---|---|---|---|---|
| 5,165,520 A * | 11/1992 | Herve | ............. | B65G 43/08 |
| | | | | 198/396 |
| 5,341,916 A * | 8/1994 | Doane | ............. | B65G 43/08 |
| | | | | 198/460.1 |
| 5,505,291 A * | 4/1996 | Huang | ............. | B65G 43/08 |
| | | | | 198/460.3 |
| 5,711,410 A * | 1/1998 | Cai | ............. | B65G 43/08 |
| | | | | 198/460.1 |
| 6,763,931 B1 * | 7/2004 | Brehm | ............. | B65G 43/10 |
| | | | | 198/460.1 |
| 7,793,772 B2 * | 9/2010 | Schafer | ............. | B65G 47/261 |
| | | | | 198/460.1 |
| 9,376,265 B2 * | 6/2016 | Acerbis | ............. | B65G 47/086 |
| 2004/0003982 A1 | 1/2004 | Tachibana et al. | | |
| 2015/0135845 A1 | 5/2015 | Hermey et al. | | |

FOREIGN PATENT DOCUMENTS

| | | |
|---|---|---|
| DE | 19921165 | 11/2000 |
| DE | 20121622 | 1/2003 |
| DE | 203 19 743 | 3/2005 |
| DE | 102 45 323 | 8/2006 |
| DE | 10 2007 006 839 | 8/2008 |
| DE | 20 2012 003 907 | 7/2012 |
| EP | 2 159 655 | 3/2010 |
| EP | 2 130 103 | 6/2012 |
| EP | 2 522 602 | 11/2012 |
| GB | 1 524 971 | 9/1978 |
| JP | 57-33115 | 2/1982 |
| WO | 2012/060999 | 5/2012 |

* cited by examiner

REGULATION OF DRIVES OF CONVEYING SECTIONS OF A CONVEYING SYSTEM

BACKGROUND OF THE INVENTION

Field of the Invention

The invention relates to the field of conveying technology, for example for piece goods, in particular singularised piece goods. It relates to a conveying system with conveying sections and to a method for the regulation (closed-loop control) of drives of conveying sections of the conveying system, according to the preamble of the respective independent patent claims.

Description of Related Art

Conveying devices with conveyors for the singularised conveying of products, for example printed products such as newspapers, pamphlets, brochures as well as collections of these are known. With this, a product in each case is conveyed in a manner separately from the others, thus individually, wherein the products are held by grippers, or lie in pockets or on saddles or on conveying belts. Such conveyors can extend over a conveying stretch of up to several hundred meters. They can have distributed drives, wherein the power of the drives is designed according to the course of the respective conveyor. Transfer conveyors can be applied for the transfer of products between conveyors. Their movement must be synchronised with the movement of the conveyors, so that the products can be transferred individually. This can be effected by way of a centralised, superordinate control or a clock setting. This however increases the complexity of the control as well as the effort with regard to programming and starting operation of the control.

EP 2 130 103 B1 describes a drive control system for a conveying belt. A balanced introduction of force and regulation of the speed is to be rendered possible. For this, a loading of the conveying belt is measured and necessary drive moments for several drives are centrally computed by way of a dynamic chain pull computation software. The loading (load) is measured by way of counting how many chain links are located in a given section, or by way of detecting where individual conveyed products are located along the conveying path. It must, therefore, be known as to how an individual product affects the loading of the belt, and moreover in dependence on whether the belt runs horizontally or ascends or descends. A central control is also present, and this must have information regarding all sections of the conveying belt.

DE 102 45 323 B4 discloses a method for determining the speed of a chain link belt. Thereby, a characteristic of the belt is constantly measured at two locations, past which the belt runs. The measurement signals are correlated to one another, by which means a temporal offset results, and, from this, the speed of the belt.

DE 20 2012 003 907 U1 describes a monitoring system for tensile and compressive forces in a chain serving for leading cables, hoses and likewise in a protected manner. An element for measuring these forces is arranged on a moved end of the chain for this. The element is designed as a cantilever and includes sensors for measuring its deformation.

DE 201 21 622 U1 discloses a conveying chain that has microsensors on the chain links for the purpose of monitoring. The microsensors, for example, include strain gauges, as well as data memories and means for the wireless data transmission to an external measurement data evaluation.

DE 203 19 743 U1 shows a control device for monitoring the mechanical tension of a saw chain. The tension can be measured by way of a spring-loaded lever engaging below the saw chain.

GB 1 524 971 discloses the regulation, which is to say servo control or closed loop control, of a conveying system with several drives. Each drive has a speed regulation. Each speed regulation receives a command signal from a superordinate torque regulation, in order to regulate the torque of the associated drive to a torque reference value. The torque reference value for several slave drives is equal to the actual torque of a master drive. The measurement of the torque of each drive is effected by way of a measurement of the current for feeding the drive. The speed is measured by a tachogenerator on the drive shaft.

WO 2102/060999 concerns itself with the damping of oscillations of an elastic conveying belt. Distributed drives are applied for this, and these, although serving primarily for damping oscillation, however can also serve for assisting a main drive. The oscillations are measured by acceleration sensors that run along on the belt, for example in three orthogonal directions. A regulation zone along the belt is assigned in each case to a drive controller. Acceleration sensors in a regulation zone transmit their measurements to a controller for this zone in each case.

EP 2159655 describes a centralised control of distributed controllers in a conveying system. The emphasis of the application relates to the communication between these controllers. One speaks of a load sensor and of a load height sensor, which are reflective-type sensors. It is obviously the case of sensors that detect the presence of a transported object (load), which is the load status.

JP S5733115 in a manner similar to the above-mentioned EP 2159655 appears to describe a conveying device, where individual sections are controlled according to the presence of conveyed objects, i.e. they are switched on given the presence of an object and switched off again after its conveying.

DE 102007006839 shows a conveying device with several conveying sections. Each conveying section has several drives that can be connected and disconnected. The speed of the drives is load-dependent. Regulated drives are mentioned as belonging to the state of the art and are assessed as requiring too much effort. The load (e.g. the slump of the speed at a high load) is measured at a drive which is considered as a master, and one or more further drives in the same conveying section are accordingly switched on or off DE 19921165 shows a conveying system with a belt drive. In consecutive sections, the movement in a section is stopped in each case by a pneumatic drive, if the presence of an article is detected in the subsequent section.

DE 19644092 shows how a chain tension is measured with deflection roller at one or more locations in a circulating conveyor with several drives. The speed of the drives is accordingly adapted.

SUMMARY OF THE INVENTION

It is the object of the invention, to provide a conveying system with conveying sections and a method for the regulation of drives of conveying sections of the conveying system of the initially mentioned type, which overcomes the disadvantages mentioned above.

The conveying system includes at least one first conveying section and a second conveying section, wherein the two conveying sections are driven in each case by an individual drive. The conveying system has at least one regulation (closed-loop control) unit for the regulation of a regulated drive of one of the two conveying sections, wherein this regulation unit includes:
1. a measuring device for measuring a loading of the conveying system in a coupling region between the two conveying sections;
2. and a regulation device for the regulation of the regulated drive in accordance with the measured loading.

By way of this, it is possible to realise a respective local regulation of a conveying section. It is not necessary to obtain particular information regarding conveyed goods and their position along the conveying path, on account of the local loading measurement. A superordinate control or regulation for matching all drives moreover becomes obsolete or is at least simplified.

In one embodiment, the loading corresponds to a torque transmitted between the conveying sections and/or a force transmitted between the conveying sections and/or a mechanical work or a mechanical power, which is transmitted between the conveying sections.

In one embodiment, the two conveying sections are sections of a conveyor, in which a conveying element runs through both conveying sections, wherein the coupling region lies between the conveying sections, and wherein, seen in the conveying section, either
1. the regulated drive is arranged at the end of a conveying section and is for pulling the conveying element through this conveying section, and the coupling region with the measuring device is arranged at the beginning of this conveying section; or
2. the regulated drive is arranged at the beginning of a conveying section and is for pushing the conveying element through this conveying section, and the coupling region with the measuring device is arranged at the end of this conveying section.

In one embodiment, the two conveying sections are sections of a conveyor, in which a conveying element runs through both conveying sections, wherein the coupling region lies between the two conveying sections, and wherein seen in the conveying direction, either
1. the regulated drive is arranged at the end of a conveying section and is for pulling the conveying element through this conveying section, and the coupling region with the measuring device is arranged at the beginning of the subsequent conveying section; or
2. the regulated drive is arranged at the beginning of a conveying section and for pushing the conveying element through this conveying section, and the coupling region with the measuring device is arranged at the end of the preceding conveying section.

The conveying element (conveying means) is preferably circulating. The conveying element as a pull means can include a chain or a cable. The pull means itself can be a conveying means such as, for example, a belt or a conveyor belt. The conveying element as conveying members or conveying links can, for example, include plate elements, mat elements or grippers. Such conveying elements can also be chained or linked to one another, also without an additional pull means.

For a conveyor or in a conveying section, in which the conveying element is at least mainly pulled, it is the case that: a location or region after a force introduction by way of a preceding drive can be considered as the beginning of a conveying section. A location or a region after the force introduction by way of the drive of the conveying section can be considered as the end of the conveying section.

For a conveyor or in a conveying section, in which the conveying member is at least mainly pushed, it is the case that: a location or a region before the force introduction by way of the drive of a conveying section can be considered as the beginning of the conveying section. A location or a region before a force introduction by way of a subsequent drive can be considered as the end.

The mentioned regions before or after a force introduction can each lie directly before or after the force introduction.

In one embodiment, the two conveying sections are separately circulating conveyors. Thus the conveying system according to this embodiment as conveying sections comprises at least one first conveyor and a second conveyor, wherein the two conveyors are configured to transfer a stream of products from the first to the second conveyor or from the second to the first conveyer. Thereby, the second conveyor is driven by at least one second drive. The conveying system as a regulation unit includes a synchronisation device for the synchronisation of the movement of the two conveyors, and this regulates at least the second drive. This synchronisation device in turn includes:
a mechanical coupling device between the two conveyors, which couples the movement of the two conveyors to one another;
a device for measuring a loading of the coupling device;
and a regulation device for the regulation of the second drive in accordance with the measured loading of the coupling device.

The regulation device, for example, is designed in order to regulate a drive force or a drive torque of the second drive in accordance with the measured loading.

Several second conveyors can also be synchronised with the first conveyor in the same manner. The synchronisation of the two conveyors can thus be effected in each case locally via the respective coupling and regulation.

In one embodiment, the two conveyors are configured to convey the products in a clocked and phase-synchronous manner. "Phase-synchronous" or also "clock-synchronous" means that the phase shift between the two conveyors or their movement is kept at least approximately constant.

In one embodiment, the regulation device is configured to regulate the loading to a predefined reference value (setpoint). The reference value can be constant. The reference value in particular can thereby be different to zero. The regulation according to the polarity of the reference value leads to a subsequent conveying section, in particular conveyor, in each case constantly trailing the conveying section, in particular conveyor, which precedes it, thus permanently taking a small drive power from the preceding conveying section, in particular conveyor, or conversely, the subsequent conveying section, in particular conveyor, constantly leading the preceding conveying section, in particular conveyor, thus permanently transmitting a small drive power to the preceding conveying section, in particular conveyor.

In one embodiment, the conveyors are designed to convey piece goods, in particular singularised piece goods. These can be flexible, flat (two-dimensional) products, in particular printed products. The products or piece goods can be packaged or non-packaged and/or be grouped into packs.

In one embodiment, at least one of the conveyors is a gripper conveyor, a hook conveyor, a hanging conveyor, a plate conveyor, a cam conveyor, a conveyor with joint chains, a conveying belt, a conveying strap, a pocket conveyor, a mat chain, a collection device, an insert device or a device for collating products.

Such a conveyor can also be realised as a spiral conveyor, thus with a course of the conveying path which is spiral-shaped at least in sections.

With the method for the regulation of two conveying sections of a conveying system, the two conveying sections are driven in each case by an individual drive. Thereby, a regulation unit for the regulation of a regulated drive of one of the two conveying sections carries out the following steps:

1. measuring a loading of the conveying system in a coupling region between the two conveying sections; and
2. regulating the regulated drive in accordance with the measured loading.

Thereby, the loading for example corresponds to a torque which is transmitted between the conveying sections and/or to a force transmitted between the conveying sections and/or to a mechanical work or mechanical power, which is transmitted between the conveying sections. The loading in particular is proportional to such a force, work or power. A transmitted force can correspond to a tensile force or a tensile stress or a compressive force or a compressive stress.

According to a variant of the method, the two conveying sections are sections of a conveyor, in which a conveying element runs through both conveying sections, wherein the coupling region lies between the two conveying sections, wherein for regulating an individual regulated drive either 1. the regulated drive is arranged at the end of a conveying section, and is regulated in accordance with the measured loading at the beginning of this conveying section; or
2. the regulated drive is arranged at the beginning of a conveying section, and is regulated in accordance with the measured loading at the end of this conveying section.

According to a variant of the method, the two conveying sections are sections of a conveyor, in which a conveying element runs through both conveying sections, wherein the coupling region lies between the two conveying sections, wherein for the regulation of an individual regulated drive, either 1. the regulated drive is arranged at the end of a conveying section, and is regulated in accordance with the measured loading at the beginning of the subsequent conveying section; or
2. the regulated drive is arranged at the beginning of a conveying section, and is regulated in accordance with the measured loading at the end of the preceding conveying section.

According to a variant of the method, in several conveying sections of the conveyor, the drives are regulated in each case with a local control loop in accordance with the measured loading in the respective conveying section or an adjacent conveying section. An adjacent conveying section is a preceding or a subsequent conveying section.

According to an aspect of the invention, the method serves for the synchronisation of two conveyors in a conveying system with at least one first conveyor and a second conveyor. Thereby, the two conveyors are configured to transfer a stream of products from the first to the second conveyor or from the second to the first conveyor, wherein the second conveyor is driven by at least one second drive. Thereby, a synchronisation device for the synchronisation of the movement of the two conveyors carries out the following steps:

1. measuring a loading of a coupling device between the two conveyors, which coupling device couples the movement of the two conveyors to one another; and
2. regulating the second drive in accordance with the measured loading.

In a variant of the method, the reference value is set in dependence on a total loading of the first conveyor and of the second conveyor. The total loading varies according to the weight and the number of the conveyed products and corresponds to the drive power, or the drive force or the drive moment, which is fed to the first conveyor by way of the first drive. If the loading increases, then for example the absolute value of the reference value also increases, in particularly proportionally to the loading.

The reference value can be constant. The reference value thereby in particular can be different to zero. In one variant of the method, the reference value is set in dependence on a conveying speed of the first conveyor.

In a variant of the method, the reference value is varied in a transient phase of the operation of the conveying system, in particular with an at least approximate ramp-like course. Such a ramp-like course can be realised synchronously to a running-up of the conveying speed, and/or synchronously to a filling of the conveyor with products, wherein the total loading increases.

Further preferred embodiments are to be deduced from the dependent patent claims. Thereby, the features of the method claims, with regard to context, can be combined with the device claims and vice versa.

BRIEF DESCRIPTION OF THE DRAWINGS

The subject-matter of the invention is hereinafter explained in more detail by way of preferred embodiment examples which are represented in the accompanying drawings. In each case in a schematic manner there are shown in.

Basically, the same or similar types of parts are provided with the same reference numerals in the figures.

DETAILED DESCRIPTION OF THE INVENTION

Figure 1:
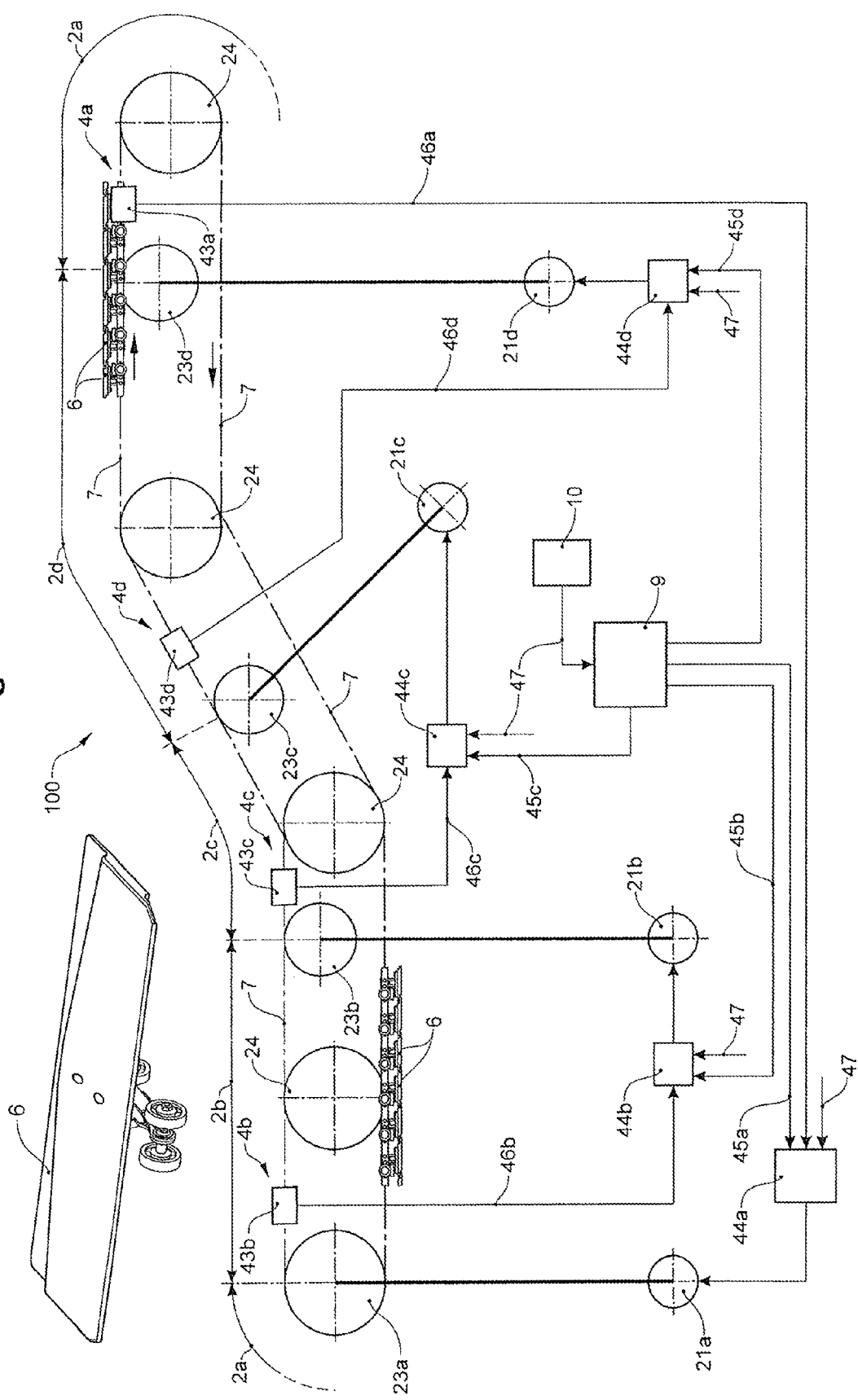
FIG. 1a conveying system with several drives and conveying sections lying therebetween.

FIG. 1 shows a conveying system 100 with a circulating conveying element 7 that is driven by several drives 21a, 21b, 21c, 21d, by which conveying sections 2a, 2b, 2c, 2d are defined between the drives. The conveying element 7 is a circulating conveying element with exemplary plate elements 6 as conveying links that are linked to one another, or are pulled by way of a pull means. The conveying element 7 runs in a guided manner around its circulating path (whose course is schematically represented by dashed lines) by way of co-running, non-driven rollers 24, amongst which are also deflection rollers. Devices for introducing force 23a, 23b, 23c, 23d, which drive the conveying element, are arranged at several locations of the circulating path. These, for example, are cogs or cam wheels. They act for example in a deflection drive or in a tow drive. These force introductions 23a, 23b, 23c, 23d are driven in each case by drives 21a, 21b, 21c, 21d. The drives 21a, 21b, 21c, 21d for example are electric motors, in particular asynchronous motors. The circulating path of the conveying element 7 is subdivided into several conveying sections 2a, 2b, 2c, 2d by way of the arrangement of the force introductions 23a, 23b, 23c, 23d, wherein a return section 2a can also be considered as a conveying section. A drive 21a, 21b, 21c, 21d can be assigned to each conveying section 2a, 2b, 2c, 2d. The respectively assigned drive 21a, 21b, 21c, 21d drives the conveying element in this conveying section 2a, 2b, 2c, 2d via an assigned force introduction 23a, 23b, 23c, 23d. In regions, in which the conveying element 7 is pulled by the drives, a conveying section 2a, 2b, 2c, 2d in each case departing from an assigned force introduction 23a, 23b, 23c, 23d extends counter to the conveying direction up to a coupling region 4a, 4b, 4c, 4d, which lies directly subsequent to the preceding force introduction 23a, 23b, 23c, 23d. In regions, in which the conveying element 7 is pushed or shoved by the drives (not represented in FIG. 2), a conveying section in each case departing from an assigned force introduction extends in the conveying direction up to a coupling region, which lies directly before (i.e., in front of) the subsequent force introduction. The coupling region 4a, 4b, 4c, 4d in each case is therefore the region, in which a conveying section 2a, 2b, 2c, 2d is adjacent to the subsequent or preceding conveying section 2a, 2b, 2c, 2d. In regions where the drive pulls in a first conveying section and pushes or shoves in a subsequent conveying section, the drive is assigned to both conveying sections.

A measuring device 43a, 43b, 43c, 43d is arranged for the regulation of the drive of a conveying section 2a, 2b, 2c, 2d in each case. This measures the loading of the conveying system in sections, in which the conveying element 7 is pulled, in the coupling region 4a, 4b, 4c, 4d at the beginning of the conveying section 2a, 2b, 2c, 2d, between the conveying section 2a, 2b, 2c, 2d and the preceding conveying section; or, in sections, in which the conveying element 7 is pushed, in the coupling region at the end of the conveying section, between the conveying section and the subsequent conveying section.

The measuring device 43a, 43b, 43c, 43d produces a measurement signal 46a, 46b, 46c, 46d, which corresponds to a loading of the conveying system in the coupling region 4a, 4b, 4c, 4d, for example a tensile stress or compressive stress acting for the drive of the conveying element 7. The measurement itself however can also be effected by means that are known per se, for example by way of measuring a force for deflecting the conveying element 7, or by way of sensors that circulate with the conveying element 7 and detect the tensile stress or compressive stress in the conveying element, and whose readings in the coupling region 4a, 4b, 4c, 4d can be read out in each case and form the measurement signal 46a, 46b, 46c, 46d by way of this.

A regulation device 44a, 44b, 44c, 44d, which is assigned to a conveying section 2a, 2b, 2c, 2d in each case, processes the measurement signal 46a, 46b, 46c, 46d assigned to the conveying section 2a, 2b, 2c, 2d, and regulates the assigned drive 21a, 21b, 21c, 21d.

The regulation device 44a, 44b, 44c, 44d can process a total reference value as a feed forward signal 47. The total reference value can be the same for all regulation devices 44a, 44b, 44c, 44d of the conveying system. The total reference value can be specified by a superordinate control 10. The total reference value can be a reference value for a clock, a frequency or a speed of the conveying system as a whole.

The regulation device 44a, 44b, 44c, 44d can process a loading reference value for the respective loading, hereinafter simply called reference value 45a, 45b, 45c, 45d. This reference value 45a, 45b, 45c, 45d can be specified and changed by way of a control 9 of the conveying system. The reference value 45a, 45b, 45c, 45d, however, can also be stored in the regulation device 44a, 44b, 44c, 44d as a constant setting, or it can be variable with time, and for example be modified by the control device 44a, 44b, 44c, 44d in accordance with another setting, for example the feedforward signal 47.

Figure 2:
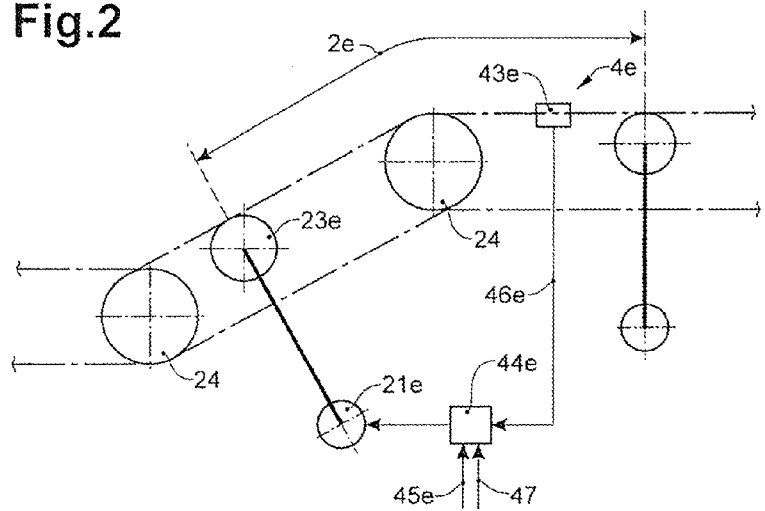
FIGS. 2-4 details of a conveying system with different structures of measuring arrangements and control loops.
Figure 3:
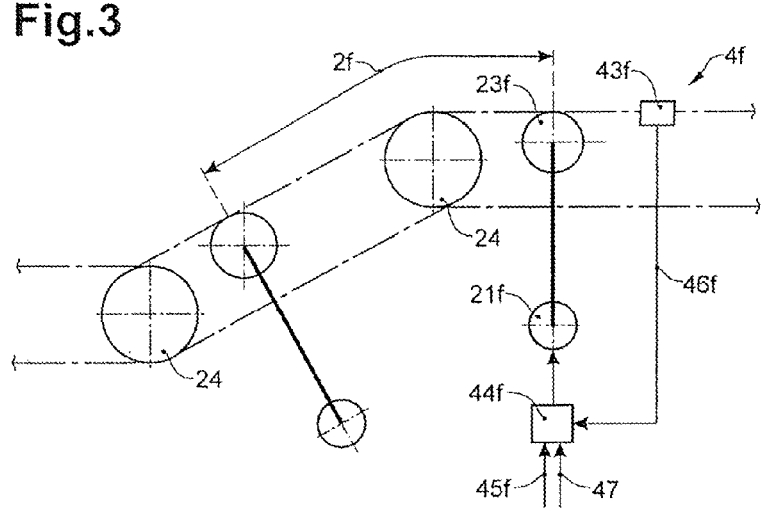
Figure 4:
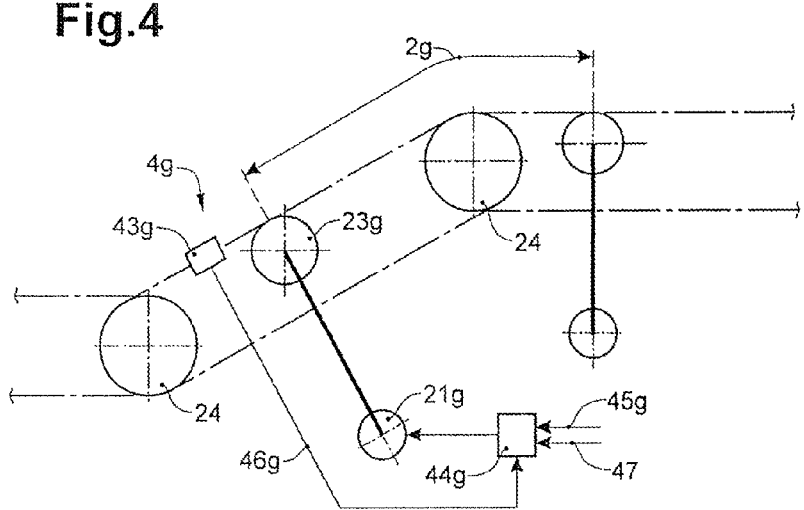

FIGS. 2-4 show details of a conveying system with different structures of measurement arrangements and control loops. These structures can be combined with one another and with the structure shown in FIG. 1, i.e. the different structures can be implemented in a conveying system by way of different sections in each case with a different structure being regulated. Thereby, it is to be ensured that no conflicts arise between the individual controllers. Each of the FIGS. 2-4 shows a drive 21e-g and a force introduction 23e-g for driving a section 2e-g, a coupling region 4e-g to an adjacent, i.e. to a preceding or subsequent section, with a measuring device 43e-g for producing a measurement signal 46e-g according to the loading in this coupling region 4e-g. The regulation is effected in each case with a regulation device 44e-g by way of the measurement signal 46e-g, a reference value 45e-g and a total reference value 47. The structures of FIG. 2-4 differ to the following extent:

1. FIG. 2: the drive 21e pushes the conveying means through the conveying section 2e and is regulated such that the loading 46e at the end of the conveying section 2e, in the coupling region 4e to the subsequent conveying section, is regulated. The conveying means is likewise pushed in the subsequent conveying section.
2. FIG. 3: the drive 21f pulls the conveying means through the conveying section 2f and is regulated such that the loading 46f at the beginning of the subsequent conveying section, in the coupling region 4f to the subsequent conveying section, is regulated. The conveying means for example is likewise pulled in the subsequent conveying section.
3. FIG. 4: the drive 21 pushes the conveying means through the conveying section 2g and is regulated such that the load 46g in the coupling region 4f to the preceding conveying section is regulated. This coupling region 4g is located at the end or the preceding conveying section. The conveying means for example is likewise pushed in the preceding conveying section.

One possible manner of functioning of the regulation devices 44a-g in the various structures described above is explained hereinafter by way of an individual regulation device 44c:

1. The regulation device 44c by way of the total reference value of the feedforward signal 47 specifies a clock, a frequency or a speed to the drive 21c—according to the type of the total reference value. The regulation device 44c can be a subordinate drive regulation which ensures that an actual value corresponding to this value is at least approximately reached. The subordinate regulation for this can comprise a measuring device for the measurement of this actual value.
2. The control device 44c modifies (i.e. increases or reduces) the drive force or the drive power or the drive moment of the drive 21c by way of the reference value 45c and the value of the measurement signal 46c, in order at least approximately to bring the measurement signal to the reference value 45c. Alternatively, the regulation device 44c can modify the total reference value, before it is led to the drive 21c or a subordinate drive regulation.

According to one embodiment therefore, the controller can form a cascaded regulation for the total reference value, the loading of the chain and the drive moment.

The various mentioned controllers for example can be P-controllers, PI-controllers, PID controllers, state controllers, predictive controllers etc.

An analog or digital implementation of the controllers of the regulation devices 44a-g can be spatially distributed with regard to hardware. The implementation can, however, also be effected centrally in a common computation unit, wherein the individual control loops however with regard to control technology remain decoupled from one another, i.e. the individual control loops continue to only regulate in each case only one conveying section 2a-g in a local manner.

According to another possible manner of functioning (not illustrated), all or at least several measurement signals 46a-g from different conveying sections 2a-g are led to the control 9 of the conveying system, and the control 9 of the conveying system regulates the drives 21a-g whilst optimising a total target function. The total target function take the difference of the individual measurement signals 46a-g from respective reference values 45a-g into account, as well as a difference of the speed of the individual drives 21a-g, or of the clock, the frequency or the speed of the conveying system, from respective reference values. A MIMO (multi-input multi-output) regulation method can be used for this.

Figure 5:
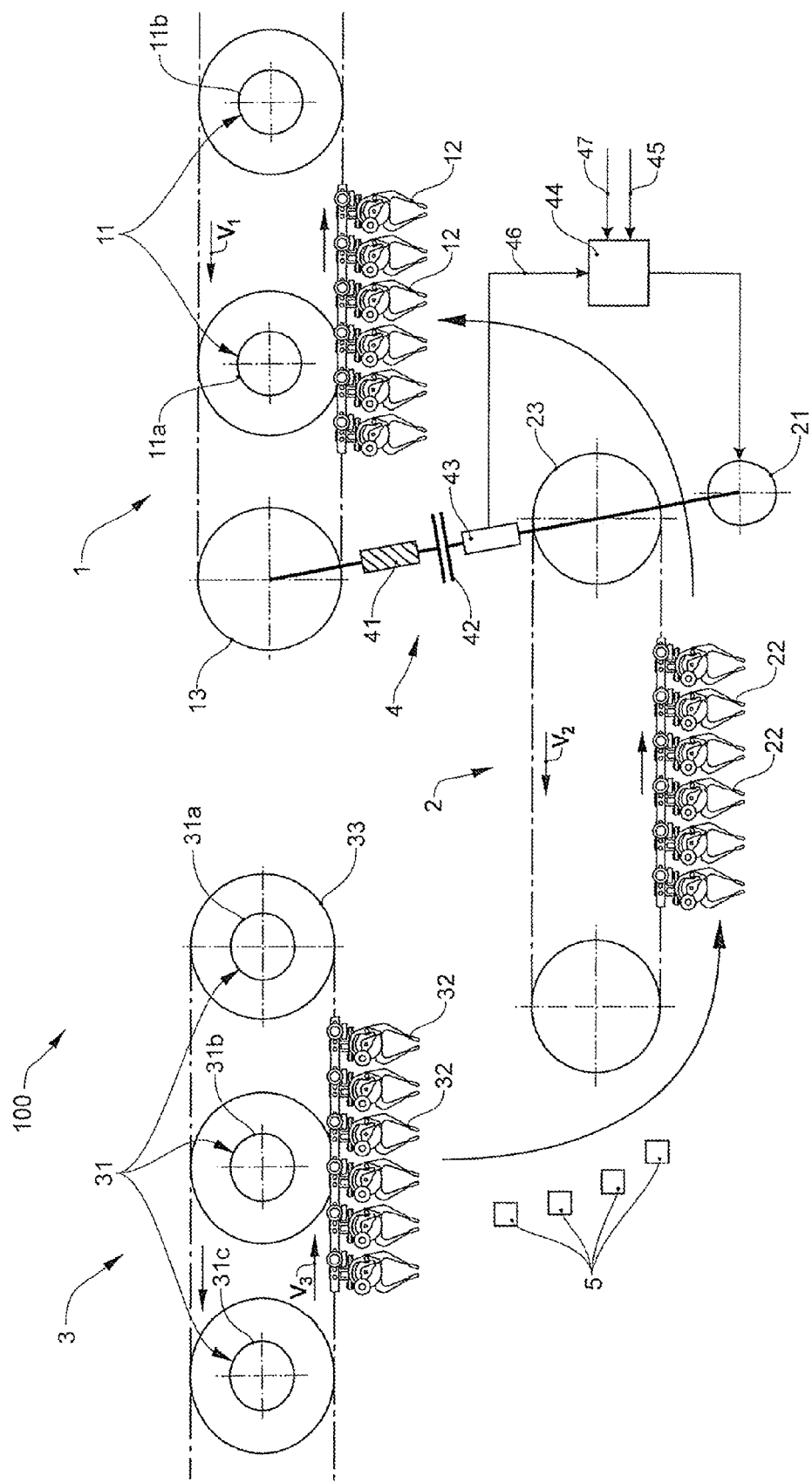
FIG. 5 a conveying system with two conveyors and a transfer conveyor which is synchronised with at least one of the two conveyors.

FIG. 5 shows a conveying system 100 with two conveyors 1, 3 and a transfer conveyor 2, which is synchronised with at least one of the two conveyors. The conveyors 1, 2, 3 are configured to convey piece goods, wherein one product is conveyed separately from the others, thus individually in each case. The conveyors 1, 2, 3 each comprise grippers 12, 22, 32 for this. These can form a chain of grippers 12, 22, 32. The grippers 12, 22, 32 or corresponding chains are driven by drives 11, 21, 31 and in the synchronised condition move at nominal conveying speeds $v_1$, $v_2$, $v_3$. The chains run around deflection rollers or wheels 13, 23, 33 at the end of a conveying stretch or path. A first drive 11 in the case of a first conveyor 1 can be realised by way of distributed drives 11a, 11b, ... which are arranged along the conveyor. 1 The conveyor 1 can extend over a conveying stretch up to several hundred meters. The same applies to the third conveyor 3 with a drive 31 consisting of several distributed drives 31a, 31b, 31c as the case may be. The position and the power of the drives are designed according to the course of the respective conveyor.

A transfer conveyor as a second conveyor 2 is arranged with one or several second drives 21 and second grippers 22, for the transfer of products 5 from the first conveyor 1 to the third conveyor 3 or vice versa. For this, the second conveyor 2 in the known manner receives the products 5 for example from the third conveyor 3 and transfers them onto the first conveyor 5. The products 5 are only represented schematically, and the product streams at the transfer are represented by arrows.

The first conveyor 1 and the third conveyor 3 can be synchronised with one another in the known manner by way of a superordinate control. The second conveyor 2 could be synchronised in the same manner, but a local synchronisation is realised for simplifying the control. This is effected primarily by a mechanical coupling of the movement of the second conveyor 2 with the movement of the first conveyor 1, for example via a gear, shafts, chains etc. This coupling therefore in a mechanical manner causes the speed of the second conveyor 2 to also have its nominal value if the speed of the first conveyor 1 has its nominal value. The second conveyor 2 has its own second drive 21, so that the first drives 11 are not loaded due to the coupling. If this second drive 21 and thus the second conveyor 2 although running with a speed which is synchronous to the first conveyor 1, however leads it or trails it, thus has a certain slip, then the movement of the first conveyor 1 is disrupted by way of this, due to drive energy being taken from or fed to the first conveyor 1. The synchronisation device 4, 43, 44 put forward here is therefore applied. This comprises:

a mechanical coupling device 4 between the two conveyors 1, 2, which couples the movement of the two conveyors 1, 2 to one another;

a device 43 for measuring a loading of the coupling device or coupling 4;

and a regulation device 44 for the regulation of the second drive 21 in accordance with the measured loading of the coupling device 4. The regulated variable of the second drive—depending on how a local subordinate drive regulation is designed—can be a drive force or a drive torque or a drive power, which act directly or indirectly upon the second conveyor 2, or can be a motor current etc.

The coupling device or coupling 4 can comprise a gear and/or a damping 41, as well as a clutch 42 for coupling or decoupling the movement of the two conveyors. The clutch 42 can be used for decoupling the second conveyor 2 from the first conveyor 1, for example in the case of an emergency stop or a malfunction or overloading, or if the second conveyor 2 is not in use.

The device 43 for measuring a loading of the coupling device in particular realises a torque measurement, but it can also measure a force which changes in accordance with the loading of the coupling 4. Such a force for example can be a force which acts upon a deflection roller or upon a gear element of the coupling 4. The measured loading, for example, is positive if the second conveyor 2 is pulled by the first conveyor 1, thus if drive energy is taken from the first conveyor 1. Conversely, it is negative if the second conveyor 2 assists in driving the first conveyor 1.

The regulation device 44 varies the drive force or the drive power of the second drive 21, so that the measured loading follows a reference value 45 or comes as close as possible to it. Suitable controllers are known, for example PID controllers or state controllers, predictive controllers etc. The manner of functioning in detail can be such as specified above with regard to the different structures. The controller as an additional input can have a feedforward signal 47 corresponding to the speed or the loading of the first conveyor 1 or according to a reference value from a regulation of the first conveyor 1. With this for example, the precontrol signal corresponds to a total reference value for a speed of the complete conveying system.

The reference value 45 for the regulation device 44 can be constant. The reference value 45 in particular can be different to zero. This in particular applies to the stationary operation of the conveying device. Polarity changes in the deviation of the loading are avoided with a reference value 45 different to zero, and in turn discontinuities ("jumps") in operation of the second drive 21. The magnitude of the reference value 45—in the case of a torque at the drive shaft between the two conveyors 1, 2—for example is about five Nm.

The invention claimed is:

1. A conveying system with at least one first conveying section and with a second conveying section, wherein the two conveying sections are driven in each case by an individual drive, the conveying system comprising:
   a mechanical coupling between the two conveying sections,
   wherein the mechanical coupling couples the movement of the two conveying sections to one another, and
   at least one regulation unit for regulating a regulated drive of one of the two conveying sections, said at least one regulating unit comprising:
      a measuring device for measuring a loading of the mechanical coupling between the two conveying sections of the conveying system in a coupling region between the two conveying sections; and,
      a regulating device for regulating the regulated drive in accordance with the measured loading.

2. The conveying system according to claim 1, wherein the loading corresponds to a torque transmitted between the conveying sections and/or to a force transmitted between the conveying sections and/or to a mechanical work or mechanical power, which is transmitted between the conveying sections.

3. The conveying system according to claim 1, wherein the two conveying sections are sections of a conveyor, in which a conveying element runs through both conveying sections, wherein the coupling region lies between the two conveying sections and wherein seen in the conveying direction either:
   the regulated drive is arranged at the end of one of said two conveying sections and is for pulling the conveying element through said one conveying section, and the coupling region with the measuring device is arranged at the beginning of said one conveying section; or
   the regulated drive is arranged at the beginning of a second of said two conveying sections and is for pushing the conveying element through said second conveying section, and the coupling region with the measuring device is arranged at the end of said second conveying section.

4. The conveying system according to claim 1, wherein the two conveying sections are sections of a conveyor, in which a conveying element runs through both conveying sections, wherein the coupling region lies between the two conveying sections and wherein, seen in the conveying direction, either
   the regulated section is arranged at the end of one conveying section and is for pulling the conveying element through said one conveying section, and the coupling region with the measuring device is arranged at the beginning of a subsequent conveying section; or
   the regulated drive is arranged at the beginning of a second conveying section and is for pushing the conveying element through said second conveying section, and the coupling region with the measuring device is arranged at the end of a preceding conveying section.

5. The conveying system according to claim 1, wherein the two conveying sections are separately circulating conveyors, and the two conveyors are configured to transfer a stream of products from a first conveyor to a second conveyor or from the second to the first conveyor, wherein the second conveyor is driven by at least the regulated drive, and wherein the coupling region is formed by a mechanical coupling device between the two conveyors, which couples the movement of the two conveyors to one another, and the measuring device is designed for measuring a loading of the coupling device.

6. The conveying system according to claim 5, wherein the two conveyors are configured to convey the products in a clocked and phase-synchronous manner.

7. The conveying system according to claim 5, wherein the coupling device comprises a clutch for the coupling together or decoupling the movement of the two conveyors.

8. The conveying system according to claim 1, wherein the control device is configured to regulate the loading to a predefined reference value.

9. A method for regulating two conveying sections of a conveying system, comprising the steps of:
   driving said two conveying sections, in each case, by an individual drive, and
   coupling the movement of the two conveying sections to one another by a mechanical coupling between the two conveying sections,
   wherein a regulating unit for regulating a regulated drive of one of the two conveying sections carries out the following steps:
      measuring a loading of the mechanical coupling between the two conveying sections of the conveying system in a coupling region between the two conveying sections; and
      regulating the regulated drive in accordance with the measured loading.

10. The method according to claim 9, wherein the loading corresponds to a torque transmitted between the conveying sections and/or to a force transmitted between the conveying sections and/or to a mechanical work or mechanical power, which is transmitted between the conveying sections.

11. The method according to claim 9, wherein the two conveying sections are sections of a conveyor, in which a conveying element runs through both conveying sections, wherein the coupling region lies between the two conveying sections, and for the regulation of an individual regulated drive either:
   the regulated drive is arranged at the end of a conveying section, and is regulated in accordance with the measured loading at the beginning of this conveying section; or
   the regulated drive is arranged at the beginning of a conveying section, and is regulated in accordance with the measured loading at the end of this conveying section.

12. The method according to claim 9, wherein the two conveying sections are sections of a conveyor, in which a conveying element runs through both conveying sections, wherein the coupling region lies between the two conveying sections, and for regulating an individual regulated drive either
   the regulated drive is arranged at the end of a conveying section, and is regulated in accordance with the measured loading at the beginning of the subsequent conveying section; or
   the regulated drive is arranged at the beginning of a conveying section, and is regulated in accordance with the measured loading at the end of the preceding conveying section.

13. The method according to claim 9, wherein in several conveying sections of the conveyor, the drives are each regulated with a local control loop in accordance with the measured loading in the respective conveying section or an adjacent conveying section.

14. The method according to claim 9, wherein the two conveying sections are separately circulating conveyors, and the two conveyors transfer a stream of products from a first conveyor to a second conveyor or from the second to the first conveyor, wherein the second conveyor is driven by at least the regulated drive, wherein the regulation unit for regulating the movement of the two conveyor carries out the following steps:

measuring a loading of a mechanical coupling device between the two conveyors, which coupling device couples the movement of the two conveyors to one another; and regulating the regulated drive in accordance with the measured loading.

15. The method according to claim 9, wherein the loading is regulated to a predefined reference value.

16. The method according to claim 15, wherein the predefined reference value is set in dependence on a total loading of one of the conveyors or of the complete conveying system.

17. The method according to claim 15, wherein the predefined reference value is set in dependence on a conveying speed of the conveying system.

18. The method according to claim 15, wherein the predefined reference value is varied in a transient phase of the operation of the conveying system.

* * * * *